United States Patent
Inose et al.

(10) Patent No.: US 10,774,598 B2
(45) Date of Patent: Sep. 15, 2020

(54) THREADED JOINT FOR STEEL PIPES

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Keita Inose, Amagasaki (JP); Fumio Ota, Wakayama (JP); Shin Ugai, Wakayama (JP); Suguru Yamaguchi, Houston, TX (US); Masaaki Sugino, Nishinomiya (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 619 days.

(21) Appl. No.: 15/311,210

(22) PCT Filed: Jun. 16, 2015

(86) PCT No.: PCT/JP2015/002993
§ 371 (c)(1),
(2) Date: Nov. 15, 2016

(87) PCT Pub. No.: WO2015/194160
PCT Pub. Date: Dec. 23, 2015

(65) Prior Publication Data
US 2017/0101830 A1  Apr. 13, 2017

(30) Foreign Application Priority Data
Jun. 20, 2014 (JP) .................. 2014-127673

(51) Int. Cl.
*F16L 15/00* (2006.01)
*E21B 17/042* (2006.01)
(Continued)

(52) U.S. Cl.
CPC .......... *E21B 17/0423* (2013.01); *E21B 17/04* (2013.01); *F16L 15/00* (2013.01);
(Continued)

(58) Field of Classification Search
CPC .................................................... F16L 15/002
See application file for complete search history.

(56) References Cited

U.S. PATENT DOCUMENTS 4,009,893 A * 3/1977 Schatton ............... E21B 17/042
285/110
4,161,332 A * 7/1979 Blose .................. E21B 17/0423
285/334
(Continued)

FOREIGN PATENT DOCUMENTS

CA  2361217 A1 * 5/2002 ......... E21B 17/0423
JP  10-89554      4/1998
(Continued)

*Primary Examiner* — David Bochna
*Assistant Examiner* — James A Linford
(74) *Attorney, Agent, or Firm* — Clark & Brody LP

(57) ABSTRACT

A threaded joint is constructed of a pin and a box. The pin includes, in order from an end thereof, a shoulder surface, a nose portion, a first sealing surface, a first male threaded portion, an annular portion, a second sealing surface, and a second male threaded portion. The box includes a shoulder surface, a recessed portion, a first sealing surface, a first female threaded portion, an annular portion, a second sealing surface, and a second female threaded portion. In the threaded joint, in a fastened state, the shoulder surfaces are in contact with each other, the first sealing surfaces are in contact with each other, the second sealing surfaces are in contact with each other, a clearance is provided between the nose portion and the recessed portion, a clearance is provided between the annular portions.

16 Claims, 7 Drawing Sheets

(51) Int. Cl.
*E21B 17/04* (2006.01)
*F16L 15/04* (2006.01)

(52) U.S. Cl.
CPC ........... *F16L 15/002* (2013.01); *F16L 15/004* (2013.01); *F16L 15/04* (2013.01)

(56) References Cited

U.S. PATENT DOCUMENTS

| | | | | |
|---|---|---|---|---|
| 4,629,224 A | * | 12/1986 | Landriault | E21B 17/0423 285/334 |
| 4,662,659 A | | 5/1987 | Blose et al. | |
| 5,154,452 A | * | 10/1992 | Johnson | E21B 17/0423 285/148.19 |
| 5,462,315 A | * | 10/1995 | Klementich | E21B 17/0423 285/24 |
| 6,543,816 B1 | | 4/2003 | Noel | |
| 2003/0234538 A1 | | 12/2003 | Hashem | |
| 2012/0043756 A1 | * | 2/2012 | Elder | E21B 17/08 285/333 |

FOREIGN PATENT DOCUMENTS

| | | |
|---|---|---|
| JP | 2006-526747 | 11/2006 |
| WO | 01/29476 | 4/2001 |
| WO | 2013/108931 | 7/2013 |

* cited by examiner

US 10,774,598 B2

THREADED JOINT FOR STEEL PIPES

TECHNICAL FIELD

The present invention relates to a threaded joint for use in connecting steel pipes or tubes (hereinafter also referred to as "steel pipes").

BACKGROUND ART

In oil wells, natural gas wells, and the like (hereinafter also collectively referred to as "oil wells"), oil well tubular (OCTG: oil country tubular goods), such as casings and tubings, are used for extraction of underground resources. Oil country tubular goods are sequentially connected to each other, and threaded joints are used for the connection.

Threaded joints for steel pipes are classified into two types: coupling-type joints and integral-type joints. A coupling-type threaded joint is constituted by a pair of tubular goods that are to be connected to each other, of which one is a steel pipe and the other is a coupling. In this case, the steel pipe includes male threaded portions formed on the outer peripheries at both ends thereof, and the coupling includes female threaded portions formed on the inner peripheries at both ends thereof. The male threaded portion of the steel pipe is screwed into the female threaded portion of the coupling, thereby fastening the thread to complete connecting. An integral-type threaded joint is constituted by a pair of steel pipes as tubular goods that are to be connected to each other, without a separate coupling being used. In this case, each steel pipe includes a male threaded portion formed on the outer periphery at one end thereof and a female threaded portion formed on the inner periphery at the other end thereof. The male threaded portion of one of the steel pipes is screwed into the female threaded portion of the other of the steel pipes, thereby fastening the thread to complete connecting.

In general, the joint portion at the tubular end where a male threaded portion is disposed is referred to as a pin because it includes an element that is inserted into a female threaded portion. On the other hand, the joint portion at the tubular end where a female threaded portion is disposed is referred to as a box because it includes an element that receives a male threaded portion. Pins and boxes both have a tubular shape because they are constituted by end portions of tubular goods.

FIG. 1 is a longitudinal sectional view showing an example of a typical conventional threaded joint for steel pipes. The threaded joint shown in FIG. 1 is a coupling-type threaded joint and is constructed of a pin 110 and a box 120.

The pin 110 includes, in order from the free end thereof toward the tubular body, a shoulder surface 111, a sealing surface 113, and a male threaded portion 114. The box 120 includes, in order from the tubular body side toward the free end, a shoulder surface 121, a sealing surface 123, and a female threaded portion 124. The shoulder surface 121, the sealing surface 123, and the female threaded portion 124 of the box 120 are provided corresponding to the shoulder surface 111, the sealing surface 113, and the male threaded portion 114 of the pin 110, respectively. The male threaded portion 114 of the pin 110 and the female threaded portion 124 of the box 120 are configured to engage with each other and constitute a tapered threaded portion with trapezoidal threads.

The male threaded portion 114 and the female threaded portion 124 are threadedly engageable with each other, and in a fastened state, they engage in intimate contact with each other to have an interference fit. The sealing surfaces 113, 123 are brought into contact with each other by the screwing of the pin 110, and in a fastened state, they engage in intimate contact with each other to have an interference fit. With this, the sealing surfaces 113, 123 form a seal portion therebetween with metal-to-metal contact. The shoulder surfaces 111, 121 are brought into contact and pressed against each other by the screwing of the pin 110, and serve as stoppers for restricting the screwing of the pin 110. The shoulder surfaces 111, 121, in a fastened state, serve to impart the so-called thread tightening axial force to load flanks of the male threaded portion 114 of the pin 110.

With a threaded joint having this configuration, the sealing performance is ensured by the engagement and intimate contact between the sealing surfaces 113, 123 as well as the engagement and intimate contact between the male threaded portion 114 and the female threaded portion 124.

In recent years, oil well environments have increasingly become deep-underground or ultra deep-water environments, and accordingly have become harsh environments with high temperatures, high pressures, and high corrosivity. For application in such harsh environments, heavy wall steel pipes are widely used as oil country tubular goods. Threaded joints used to connect such steel pipes are required to provide excellent sealing performance against internal pressure and external pressure.

The following are examples of conventional techniques that have attempted to improve the sealing performance of threaded joints for heavy wall steel pipes.

FIG. 2 is a longitudinal sectional view showing an example of a conventional threaded joint for steel pipes which was designed to provide improved sealing performance. The threaded joint shown in FIG. 2 includes two metal-to-metal seal portions (see, for example, International Publication No. WO01/029476 (Patent Literature 1)).

Specifically, as shown in FIG. 2, the pin 210 includes, in order from the free end thereof toward the tubular body, a shoulder surface 211, a first sealing surface 213, a first male threaded portion 214, a second sealing surface 216, and a second male threaded portion 217. The box 220 includes, in order from the tubular body side toward the free end, a shoulder surface 221, a first sealing surface 223, a first female threaded portion 224, a second sealing surface 226, and a second female threaded portion 227. A first threaded portion constituted by the first male threaded portion 214 and the first female threaded portion 224 is a tapered threaded portion with trapezoidal threads. A second threaded portion constituted by the second male threaded portion 217 and the second female threaded portion 227 is also a tapered threaded portion with trapezoidal threads.

FIG. 3 is a longitudinal sectional view showing another example of a conventional threaded joint for steel pipes which was designed to provide improved sealing performance. The threaded joint shown in FIG. 3 is similar to the threaded joint shown in FIG. 2 in that it includes two metal-to-metal seal portions, but differs in that the locations of the shoulder surfaces have been modified (see, for example, U.S. Pat. No. 4,662,659 (Patent Literature 2)).

Specifically, as shown in FIG. 3, the pin 210 includes, in order from the free end thereof toward the tubular body, a first sealing surface 213, a first male threaded portion 214, a shoulder surface 211, a second sealing surface 216, and a second male threaded portion 217. The box 220 includes, in order from the tubular body side toward the free end, a first sealing surface 223, a first female threaded portion 224, a shoulder surface 221, a second sealing surface 226, and a second female threaded portion 227. A first threaded portion constituted by the first male threaded portion 214 and the first female threaded portion 224 and a second threaded portion constituted by the second male threaded portion 217 and the second female threaded portion 227 are each a tapered threaded portion with trapezoidal threads.

In the case of the threaded joint shown in FIG. 2, the tapered surface defined by the first threaded portion and the tapered surface defined by the second threaded portion are the same. In this configuration, the second sealing surfaces 216, 226 are simply added between the first threaded portion and the second threaded portion. In contrast, in the case of the threaded joint shown in FIG. 3, the tapered surface defined by the first threaded portion is closer to the pipe axis CL than the tapered surface defined by the second threaded portion. In this configuration, the shoulder surface 211, 221 are provided between the first threaded portion and the second threaded portion.

In both the threaded joints shown in FIGS. 2 and 3, the male threaded portion 214 and the female threaded portion 224 are threadedly engageable with each other, and in a fastened state, they engage in intimate contact with each other to have an interference fit. Likewise, the second male threaded portion 217 and the second female threaded portion 227 have an interference fit between them. The first sealing surfaces 213, 223 and the second sealing surfaces 216, 226 are each brought into contact with each other by the screwing of the pin 210 and, in a fastened state, they engage in intimate contact with each other to have an interference fit. The shoulder surfaces 211, 221 are brought into contact and pressed against each other by the screwing of the pin 210.

With a threaded joint having this configuration, sealing performance primarily against internal pressure is ensured by the engagement and intimate contact between the first sealing surfaces 213, 223. Also, sealing performance primarily against external pressure is ensured by the engagement and intimate contact between the second sealing surfaces 216, 226.

CITATION LIST

Patent Literature

Patent Literature 1: International Publication No. WO01/029476
Patent Literature 2: U.S. Pat. No. 4,662,659

SUMMARY OF INVENTION

Technical Problem

Threaded joints for use in harsh environments of recent years, particularly threaded joints for heavy wall steel pipes, are required to provide further improved sealing performance against internal and external pressures.

An object of the present invention is to provide a threaded joint for steel pipes having the following characteristics: improved sealing performance against internal pressure and external pressure.

Solution to Problem

A threaded joint for steel pipes according to an embodiment of the present invention includes a tubular pin and a tubular box, the pin and the box being fastened by screwing the pin onto the box, the pin including: in order from an end thereof, a shoulder surface; a first sealing surface; a tapered first male threaded portion; a second sealing surface; and a tapered second male threaded portion, the box including: a shoulder surface; a first sealing surface; a tapered first female threaded portion; a second sealing surface; and a tapered second female threaded portion, corresponding to the shoulder surface, the first sealing surface, the first male threaded portion, the second sealing surface, and the second male threaded portion, of the pin, respectively.

Further, the pin includes: a nose portion disposed between the shoulder surface and the first sealing surface, the nose portion being continuous with the first sealing surface; and an annular portion disposed between the first male threaded portion and the second sealing surface, the annular portion being continuous with the second sealing surface; the box includes: a recessed portion corresponding to the nose portion of the pin; and an annular portion corresponding to the annular portion of the pin.

This threaded joint is configured such that, in a fastened state: the shoulder surfaces are in contact with each other; the first sealing surfaces are in contact with each other; the second sealing surfaces are in contact with each other; a clearance is provided between the nose portion of the pin and the recessed portion of the box; a clearance is provided between the annular portion of the pin and the annular portion of the box; the first male threaded portion engages with the first female threaded portion; and the second male threaded portion engages with the second female threaded portion.

The above threaded joint may have the following configuration. The pin includes an auxiliary shoulder surface disposed between the first male threaded portion and the annular portion, the auxiliary shoulder surface being continuous with the annular portion; the box includes an auxiliary shoulder surface corresponding to the auxiliary shoulder surface of the pin; and, in a fastened state, the auxiliary shoulder surfaces are in contact with each other.

This threaded joint may preferably have the following configuration. During fastening thread, the contact between the shoulder surfaces and the contact between the auxiliary shoulder surfaces occur simultaneously, or the contact between the auxiliary shoulder surfaces occurs prior to the contact between the shoulder surfaces.

Furthermore, the above threaded joint may preferably have the following configuration. The pin is configured such that, when a tubular body having the pin has a cross-sectional area $A_0$ in a plane perpendicular to the pipe axis, and the shoulder surface has a projected area $A_1$ in a plane perpendicular to the pipe axis, an area ratio $A_1/A_0$ is at least 30%.

Furthermore, the above threaded joint may preferably have the following configuration. The pin is configured such that, when a tubular body having the pin has a cross-sectional area $A_0$ in a plane perpendicular to the pipe axis, and the shoulder surface and the auxiliary shoulder surface have projected areas in a plane perpendicular to the pipe axis with a total of the projected areas being designated as $A_2$, an area ratio $A_2/A_0$ is at least 30%.

Furthermore, the above threaded joint may preferably have the following configuration. The pin is configured such that, when the shoulder surface and the auxiliary shoulder surface have projected areas in a plane perpendicular to the pipe axis, with a total of the projected areas being designated as $A_2$ and the projected area of the shoulder surface being designated as $A_1$, an area ratio $A_1/A_2$ is at least 35%.

In addition, the above threaded joint may preferably have the following configuration. The annular portion of the pin has an outside diameter greater than a diameter of a reference tapered surface, the reference tapered surface being a tapered surface having an outside diameter smaller than an outside diameter of an extension of a tapered surface defined by roots of the second male threaded portion by twice a height of threads of the second male threaded portion.

In addition, the above threaded joint may preferably have the following configuration. The annular portion of the pin has a length along the pipe axis, the length being equal to or greater than a thread pitch of the second male threaded portion.

In addition, the above threaded joint may preferably have the following configuration. The nose portion of the pin has a length along the pipe axis, the length being at least 5 mm.

Advantageous Effects of Invention

A threaded joint for steel pipes of the present invention has the following significant advantages: improved sealing performance against internal pressure and external pressure.

DESCRIPTION OF EMBODIMENTS

Figure 1:
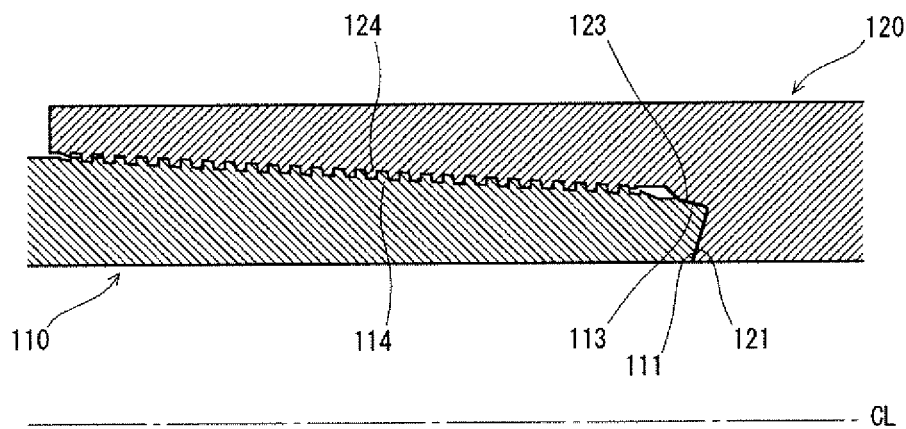
FIG. 1 is a longitudinal sectional view showing an example of a typical conventional threaded joint for steel pipes.
Figure 2:
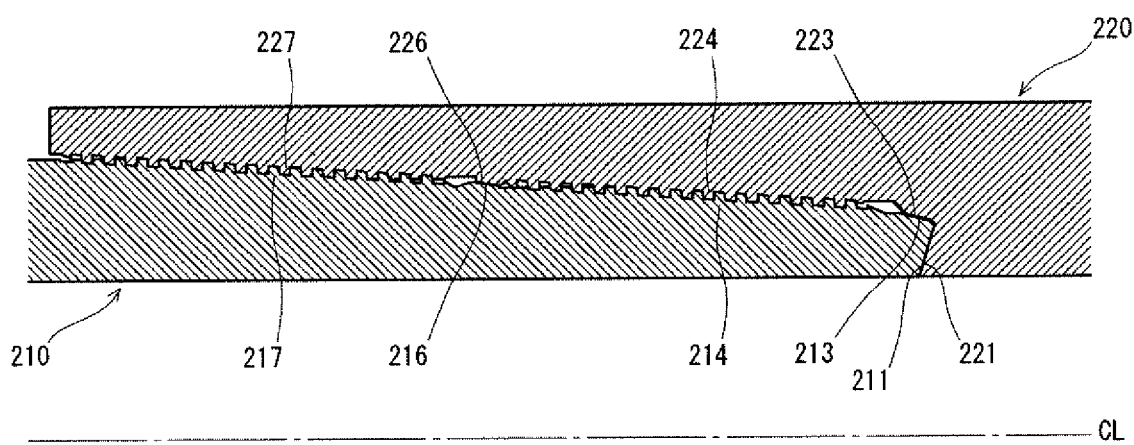
FIG. 2 is a longitudinal sectional view showing an example of a conventional threaded joint for steel pipes which was designed to provide improved sealing performance.
Figure 3:
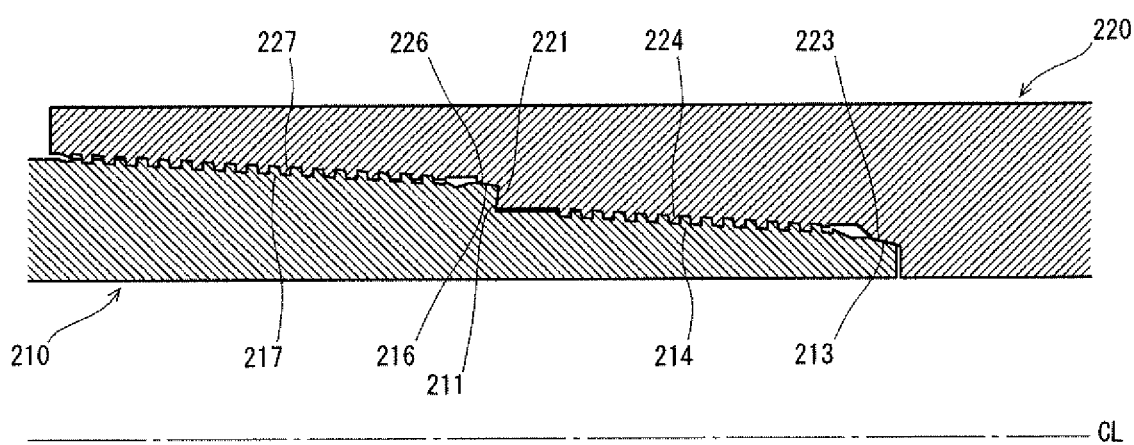
FIG. 3 is a longitudinal sectional view showing another example of a conventional threaded joint for steel pipes which was designed to provide improved sealing performance.

The present inventors conducted intense research for a configuration that enables the seal portion to provide sealing performance to the fullest extent. Their intended threaded joint was basically of the type that includes a shoulder surface disposed on the free end of the pin and two metal-to-metal seal portions. Specifically, the intended threaded joint was basically of the type that includes a first seal portion, which is the inner one that primarily contributes to sealing performance against internal pressure, and a second seal portion, which is the outer one that primarily contributes to sealing performance against external pressure. Consequently, they have made the following findings.

One method for improving sealing performance against external pressure is to increase the wall thickness of the pin. Application of external pressure to the threaded joint can cause radially inward deformation of the pin, which can result in loosening the contact between the outer, second sealing surfaces, but, by increasing the wall thickness of the pin, its resistance to radial contraction is enhanced. However, the pin inside diameter is regulated by API (American Petroleum Institute) standards while the enlargement of the pin outside diameter is restricted by structural limitations of the oil well. Thus, there are limitations to increasing the wall thickness of the pin, particularly in the region of the second sealing surface.

In view of this, the pin is provided with an annular portion disposed between the second sealing surface and the inner, first male threaded portion, such that the annular portion is continuous with the second sealing surface and extends in the pipe axis direction. As a result of the presence of the annular portion, the pin exhibits increased resistance to radial contraction in the region of the second sealing surface. Consequently, a decrease in contact pressure between the second sealing surfaces is inhibited, resulting in improved sealing performance against external pressure. In this case, the box is provided with an annular portion that is continuous with the second sealing surface thereof, the annular portion corresponding to the region of the annular portion of the pin. In a fastened state, a clearance is provided between the annular portion of the box and the annular portion of the pin. This clearance allows an excess of the grease compound (hereinafter also referred to as "dope"), applied for fastening thread, to accumulate therein, and therefore makes it possible to avoid an inadvertent decrease in contact pressure between the second sealing surfaces due to an increased pressure of the dope.

Furthermore, the pin and the box may be provided with annular portions different from the above annular portions disposed between the second sealing surfaces and the outer, second threaded portions, such that the different annular portions are continuous with the respective second sealing surfaces and extend in the pipe axis direction. In a fastened state, a clearance is provided between these annular portions. This clearance inhibits a decrease in substantial interference between the second sealing surfaces that may otherwise result from the interference engagement of the second threaded portions. Consequently, a decrease in contact pressure between the second sealing surfaces is inhibited, resulting in improved sealing performance against external pressure.

For improvement of sealing performance against internal pressure, the following two approaches may be possible. The first approach is as follows. The pin is provided with a cylindrical nose portion disposed between the inner, first sealing surface and the shoulder surface, such that the nose portion is continuous with the first sealing surface and extends in the pipe axis direction. The box is provided with a recessed portion corresponding to the nose portion of the pin. In a fastened state, a clearance is provided between the recessed portion and the nose portion. Thus, even if the shoulder surface of the pin becomes separated from the shoulder surface of the box, which can cause loosening of the contact between the first sealing surfaces, owing to the presence of the nose portion of the pin and the recessed portion of the box, the first sealing surface of the pin recovers elastically together with the nose portion. Consequently, a decrease in contact pressure between the first sealing surfaces is inhibited, so that high sealing performance against internal pressure can be achieved even while an excessive tensile load is being applied.

The second approach is to reduce the wall thickness of the pin in the region of the inner, first male threaded portion and first sealing surface, in addition to employing the above first approach. The reduced wall thickness of the pin allows for an effective radially outward deformation of the pin when internal pressure has been applied to the threaded joint, which results in amplifying the contact pressure between the inner first sealing surfaces. However, since reduction in the wall thickness of the pin involves a decrease in its stiffness, the contact between the first sealing surfaces can become loosened when internal pressure is not applied to the threaded joint. This situation can be addressed by the presence of the nose portion according to the above first approach, by which a decrease in contact pressure between the first sealing surfaces is inhibited.

The second approach may be accomplished by providing the pin with an auxiliary shoulder surface disposed between the first male threaded portion and the annular portion, such that the auxiliary shoulder surface is continuous with the annular portion, and providing the box with an auxiliary shoulder surface disposed between the first female threaded portion and the annular portion, the auxiliary shoulder surface corresponding to the auxiliary shoulder surface of the pin. When this configuration is employed, because of the presence of the auxiliary shoulder surfaces, it is possible to reduce the outside diameter of the pin in the region of the first male threaded portion and the first sealing surface and accordingly reduce the inside diameter of the box in the region of the first female threaded portion and the first sealing surface. As a result, it is easier to ensure a sufficient cross-sectional area of the critical section of the box (the cross section of the female threaded portion at a position closest to the tubular body, i.e., the cross section of the first female threaded portion at a position closest to the tubular body), whereby a reduction of the box outside diameter can be achieved.

The threaded joint for steel pipes of the present invention has been made based on the above findings. Embodiments of the threaded joint for steel pipes according to the present invention are described below.

First Embodiment

Figure 4A:
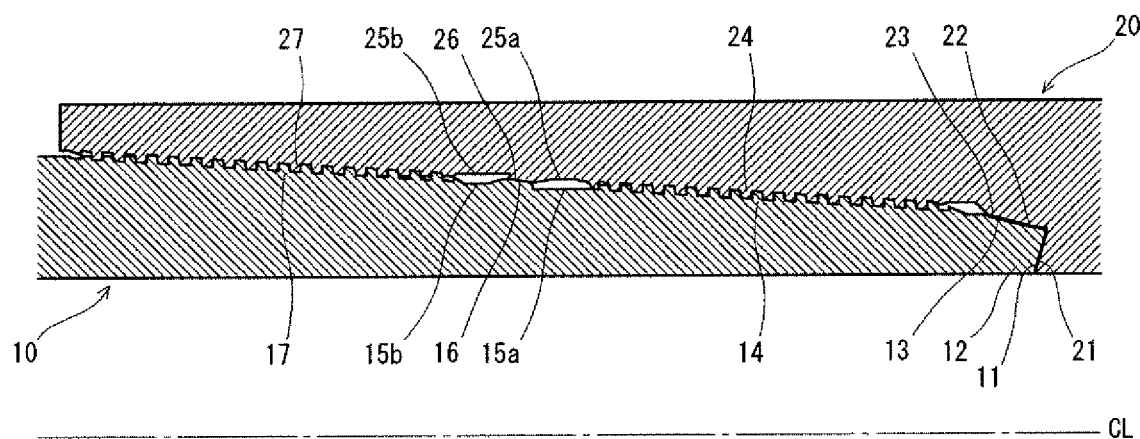
FIG. 4A is a longitudinal sectional view of a threaded joint for steel pipes according to a first embodiment of the present invention.
Figure 4B:
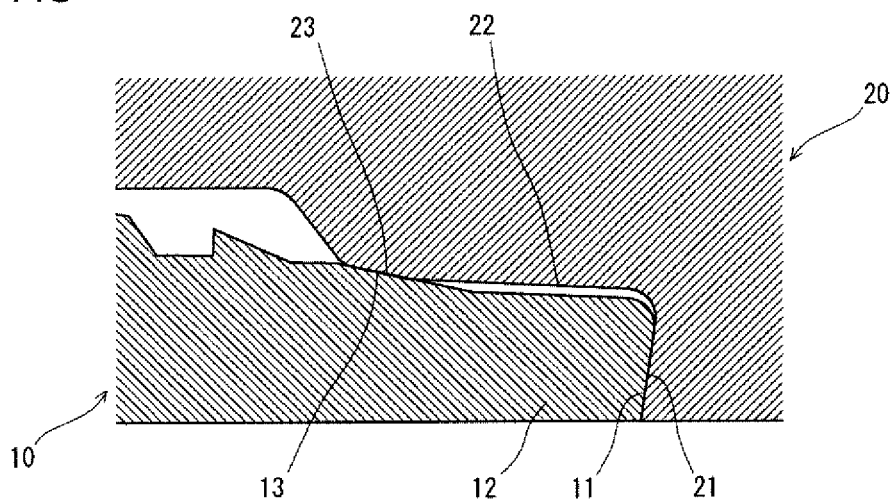
FIG. 4B is an enlarged longitudinal sectional view of the threaded joint for steel pipes according to the first embodiment, showing a region near the free end of the pin.
Figure 5:
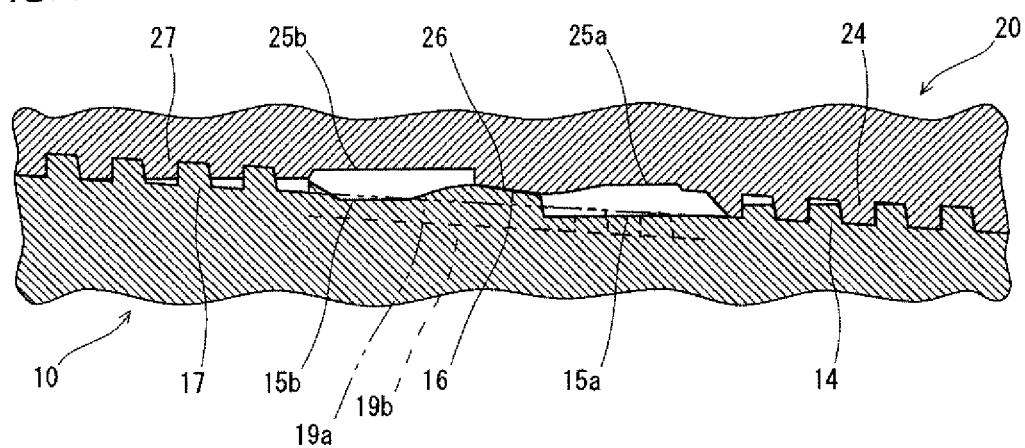
FIG. 5 is an enlarged longitudinal sectional view of the threaded joint for steel pipes according to the first embodiment of the present invention, showing a region in the vicinity of a second seal portion, which is the outer one of the seal portions.

FIG. 4A is a longitudinal sectional view of a threaded joint for steel pipes according to a first embodiment of the present invention. FIG. 4B is an enlarged longitudinal sectional view of the threaded joint for steel pipes, showing a region near the free end of the pin. FIG. 5 is an enlarged longitudinal sectional view of the threaded joint for steel pipes according to the first embodiment of the present invention, showing a region in the vicinity of a second seal portion, which is the outer one of the seal portions. As shown in FIG. 4A and FIG. 5, the threaded joint according to the first embodiment is a coupling-type threaded joint and is constructed of a pin 10 and a box 20.

The pin 10 includes, in order from the free end thereof toward the tubular body, a shoulder surface 11, a nose portion 12, a first sealing surface 13, a first male threaded portion 14, a first annular portion 15a, a second sealing surface 16, a second annular portion 15b, and a second male threaded portion 17. Both the first sealing surface 13 and the second sealing surface 16 are tapered surfaces. Technically, the first sealing surface 13 and the second sealing surface 16 each have a shape corresponding to a shape of the peripheral surface of a truncated cone having a diameter decreasing toward the end, or a shape corresponding to a combined shape of the peripheral surface of a truncated cone and the peripheral surface of a solid of revolution that can be obtained by rotating a curved line such as an arc about the pipe axis CL.

The nose portion 12, which has a cylindrical shape, is continuous with the inner first sealing surface 13 and extends in the pipe axis direction. It is to be noted that the outer peripheral surface of the nose portion 12 may instead be a surface having a taper equal to that of the first sealing surface 13, smaller (gentler) than that, or greater (steeper) than that. Technically, it has a shape corresponding to a shape of the peripheral surface of a truncated cone having a diameter decreasing toward the end, or a shape corresponding to a combined shape of the peripheral surface of a truncated cone and the peripheral surface of a solid of revolution that can be obtained by rotating a curved line such as an arc about the pipe axis CL.

The shoulder surface 11 is provided on an end of the nose portion 12. The shoulder surface 11 is an annular surface generally perpendicular to the pipe axis CL. Technically, the shoulder surface 11 is slightly inclined in such a manner that the outer circumferential side thereof is closer to the free end of the pin 10. The first annular portion 15a is continuous with the inner side of the outer, second sealing surface 16 and extends in the pipe axis direction. The inner, first male threaded portion 14 is disposed continuous with the first annular portion 15a. The second annular portion 15b is continuous with the outer side of the outer second sealing surface 16 and extends in the pipe axis direction. The outer, second male threaded portion 17 is disposed continuous with the second annular portion 15b. The outer peripheral surface of the first annular portion 15a may be of any shape as long as its stiffness can be ensured. For example, it may be a cylindrical surface or a surface having a taper smaller (gentler) than that of the tapered surface defined by the first male threaded portion 14, or may be a curved surface. The same applies to the outer peripheral surface of the second annular portion 15b.

The box 20 includes, in order from the tubular body side toward the free end, a shoulder surface 21, a recessed portion 22, a first sealing surface 23, a first female threaded portion 24, a first annular portion 25a, a second sealing surface 26, a second annular portion 25b and a second female threaded portion 27. The shoulder surface 21, recessed portion 22, first sealing surface 23, first female threaded portion 24, first annular portion 25a, second sealing surface 26, second annular portion 25b and second female threaded portion 27, of the box 20, are provided corresponding to the shoulder surface 11, nose portion 12, first sealing surface 13, first male threaded portion 14, first annular portion 15a, second sealing surface 16, second annular portion 15b, and second male threaded portion 17, of the pin 10, respectively.

FIGS. 4A and 4B show a case in which the first sealing surface 23 of the box 20 protrudes toward the first sealing surface 13 of the pin 10. It is to be noted that the first sealing surface 23 of the box 20 may not protrude. In that case, the first sealing surface 13 of the pin 10 protrudes toward the first sealing surface 23 of the box 20.

The first male threaded portion 14 of the pin 10 and the first female threaded portion 24 of the box 20 are tapered threaded portions with trapezoidal threads that mesh with each other, and constitute a first threaded portion, which is the inner one. The second male threaded portion 17 of the pin 10 and the second female threaded portion 27 of the box 20 are also tapered threaded portions with trapezoidal threads that mesh with each other, and constitute a second threaded portion, which is the outer one. In the case of the threaded joint of the first embodiment, the tapered surface defined by the first threaded portion and the tapered surface defined by the second threaded portion are the same. In this configuration, the second sealing surfaces 16, 26 are simply added between the first threaded portion and the second threaded portion.

The first male threaded portion 14 and the first female threaded portion 24 are threadedly engageable with each other, and in a fastened state, they engage in intimate contact with each other to have an interference fit. Likewise, the second male threaded portion 17 and the second female threaded portion 27 have an interference fit between them. The first sealing surface 13, 23 and the second sealing surface 16, 26 are each brought into contact with each other by the screwing of the pin 10 and, in a fastened state, they engage in intimate contact with each other to have an interference fit. Thus, the first sealing surface 13, 23 and the second sealing surface 16, 26 form a first seal portion and a second seal portion, respectively, by metal-to-metal contact. The shoulder surfaces 11, 21 are brought into contact and pressed against each other by the screwing of the pin 10, and serve as stoppers for restricting the screwing of the pin 10. Furthermore, in a fastened state, the shoulder surfaces 11, 21 serve to impart the so-called thread tightening axial force to the load flanks of the first male threaded portion 14 and the second male threaded portion 17 of the pin 10. In a fastened state, a clearance is provided between the nose portion 12 of the pin 10 and the recessed portion 22 of the box, a clearance is also provided between the first annular portion 15a of the pin 10 and the first annular portion 25a of the box 20, and a clearance is also provided between the second annular portion 15b of the pin 10 and the second annular portion 25b of the box 20.

With the threaded joint of the first embodiment having this configuration, the sealing performance primarily against internal pressure is ensured by the engagement and intimate contact between the inner first sealing surfaces 13, 23. Also, sealing performance primarily against external pressure is ensured by the engagement and intimate contact between the outer second sealing surfaces 16, 26.

In particular, since the pin 10 includes the first annular portion 15a, which is continuous with the inner side of the outer second sealing surface 16, the pin 10 exhibits increased resistance to radial contraction in the region of the second sealing surface 16 owing to the stiffness of the first annular portion 15a. Thus, even in the case where external pressure is applied to the threaded joint, radially inward deformation of the pin 10 is inhibited, so that a decrease in contact pressure between the second sealing surfaces 16, 26 is inhibited. As a result, sealing performance against external pressure is improved. In the box 20, a first annular portion 25a is provided corresponding to the first annular portion 15a of the pin 10, and in a fastened state, a clearance is provided between the first annular portions 15a, 25a. Thus, an excess of dope that has been applied for fastening thread is allowed to accumulate in the clearance. As a result, it is possible to avoid an inadvertent decrease in contact pressure between the second sealing surfaces 16, 26 due to an increased pressure of the dope.

The pin 10 and the box 20 are provided with the second annular portion 15b, 25b, respectively, which are continuous with the outer side of the outer second sealing surface 16, 26. In a fastened state, a clearance is provided between the second annular portions 15b, 25b. By virtue of this, it is possible to inhibit a decrease in contact pressure between the second sealing surfaces 16, 26 due to a decrease in substantial interference therebetween that may otherwise result from the interference engagement of the second threaded portions. Consequently, sealing performance against external pressure is improved.

Furthermore, the pin 10 is provided with the nose portion 12 that is continuous with the inner first sealing surface 13. The box 20 is provided with a recessed portion 22 corresponding to the region of the nose portion 12 of the pin 10. In a fastened state, a clearance is provided between the nose portion 12 and the recessed portion 22. In the case where an excessive tensile load is applied to the threaded joint, for example, the shoulder surface 11 of the pin 10 can become separated from the shoulder surface 21 of the box 20, causing a decrease in substantial interference between the first sealing surface 13, 23 and therefore loosening of the contact therebetween. Even in such a case, the nose portion 12 elastically recovers and thereby produces the effect of amplifying the contact pressure between the first sealing surfaces 13, 23. As a result, the decrease in contact pressure can be inhibited as a whole, and consequently, high sealing performance against internal pressure can be achieved even while an excessive tensile load is being applied.

The following are additional descriptions of preferred embodiments of the threaded joint according to the first embodiment.

With regard to the pin 10, $A_0$ is defined as a cross-sectional area of the tubular body in a plane perpendicular to the pipe axis CL, and $A_1$ is defined as a projected area of the shoulder surface 11 in a plane perpendicular to the pipe axis CL. Preferably, the area ratio $A_1/A_0$ (hereinafter also referred to as the "ratio of the shoulder surface area to the tubular body area") is at least 30%. More preferably, the area ratio $A_1/A_0$ is at least 35%. The reason for this is as follows. The area ratio $A_1/A_0$ is actually dependent on the area of the shoulder surface 11. In the case where the area ratio $A_1/A_0$ is smaller, because of the smaller area of the shoulder surface 11, the shoulder surface 11 cannot withstand an excessive compressive load when it has been applied to the threaded joint. In such a case, the shoulder surface 11, and the nose portion 12 and the first sealing surface 13 extending continuously from the shoulder surface 11, undergo plastic deformation, so that the contact between the first sealing surfaces 13, 23 becomes unstable. As a result, the contact pressure between the first sealing surfaces 13, 23 may be decreased. For this reason, the ratio of the shoulder surface area to the tubular body area $A_1/A_0$ is preferably suitably large.

The upper limit of the ratio of the shoulder surface area to the tubular body area $A_1/A_0$ is not particularly limited. However, too large an area ratio $A_1/A_0$ means the area of the shoulder surface 11 is too large, i.e., the outside diameter of the shoulder surface 11 of the pin 10 is too large. Accordingly, the box 20 has a larger inside diameter in the region of the first female threaded portion 24 and the first sealing surface 23. This results in the need to increase the outside diameter of the box 20 in order to ensure that the critical section of the box 20 has a sufficient cross-sectional area. Moreover, it becomes difficult to ensure sufficient lengths of engagement of the first threaded portion and the second threaded portion. Thus, for practical applications, the ratio of the shoulder surface area to the tubular body area $A_1/A_0$ is preferably up to 60%.

In the pin 10, the first annular portion 15a preferably has a minimum outside diameter greater than the diameter of a reference tapered surface 19b as shown in FIG. 5. The reference tapered surface 19b is a tapered surface having an outside diameter smaller than an outside diameter of an extension 19a of the tapered surface defined by the roots of the second male threaded portion 17 by twice the height of threads of the second male threaded portion 17. The reason for the above is as follows. The outside diameter of the first annular portion 15a is actually dependent on the wall thickness of the first annular portion 15a. When the outside diameter of the first annular portion 15a is smaller, which means the wall thickness of the first annular portion 15a is thinner, the resistance to radial contraction in the region of the second sealing surface 16 which results from the stiffness of the first annular portion 15a will be insufficient in the case where external pressure is applied to the threaded joint. When this occurs, the contact pressure between the second sealing surfaces 16, 26 may be decreased. For this reason, the outside diameter of the first annular portion 15a is preferably suitably large.

The upper limit of the outside diameter of the first annular portion 15a is not particularly limited. However, it is necessary that the outside diameter of the first annular portion 15a be sized so as not to interfere with the second sealing surface 26 of the box 20 during fastening thread.

In the pin 10, the first annular portion 15a preferably has a length along the pipe axis of equal to or greater than the thread pitch of the second male threaded portion 17, with the length being measured from the inner end of the second sealing surface 16. This is because, if the length of the first annular portion 15a is shorter, the contact pressure between the second sealing surfaces 16, 26 may be decreased in the case where external pressure is applied to the threaded joint, for the same reason as that for the case where the wall thickness of the first annular portion 15a is thin.

The upper limit of the length of the first annular portion 15a is not particularly limited. It is to be noted, though, that if the length of the first annular portion 15a is too long, the overall length of the joint is accordingly long, which results in increased manufacturing costs due to increased machining time and increased material costs. Also, when the length of the first annular portion 15a exceeds a certain length, the effect of improving the sealing performance will substantially no longer be increased. Thus, for practical applications, the length of the first annular portion 15a is preferably at most five times the thread pitch of the second male threaded portion 17.

In the pin 10, the second annular portion 15b preferably has a length along the pipe axis of equal to or greater than the thread pitch of the second male threaded portion 17, with the length being measured from the outer end of the second sealing surface 16. The reason is that, if the length of the second annular portion 15b is shorter, the interference engagement of the second threaded portions may cause a decrease in substantial interference between the second sealing surfaces 16, 26, and therefore the contact pressure between the second sealing surfaces 16, 26 may be decreased.

The upper limit of the length of the second annular portion 15b is not particularly limited. It is to be noted, though, that if the length of the second annular portion 15b is too long, the overall length of the joint is accordingly long, which results in increased manufacturing costs due to increased machining time and increased material costs. Also, when the length of the second annular portion 15b exceeds a certain length, the effect of improving the sealing performance will substantially no longer be increased. Thus, for practical applications, the length of the second annular portion 15b is preferably at most five times the thread pitch of the second male threaded portion 17.

In the pin 10, the nose portion 12 preferably has a length along the pipe axis of at least 5 mm. The reason for this is as follows. If the length of the nose portion 12 is shorter, the elastic recovery of the first sealing surface 13 owing to the nose portion 12 will be insufficient in the case where an excessive tensile load is applied to the threaded joint. When this occurs, the contact pressure between the first sealing surfaces 13, 23 may be decreased. For this reason, the length of the nose portion 12 is preferably suitably long.

The upper limit of the length of the nose portion 12 is not particularly limited. It is to be noted, though, that if the length of the nose portion 12 is too long, the overall length of the joint is accordingly long, which results in increased manufacturing costs due to increased machining time and increased material costs. Also, when the length of the nose portion 12 exceeds a certain length, the effect of improving the sealing performance will substantially no longer be increased. Thus, for practical applications, the length of the nose portion 12 is preferably at most five times the thread pitch of the first male threaded portion 14.

Second Embodiment

Figure 6:
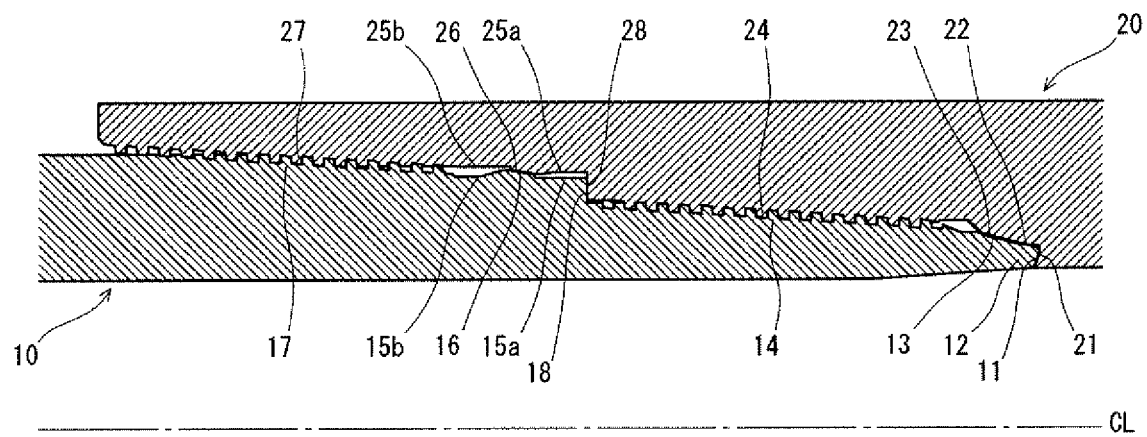
FIG. 6 is a longitudinal sectional view of a threaded joint for steel pipes according to a second embodiment of the present invention.
Figure 7:
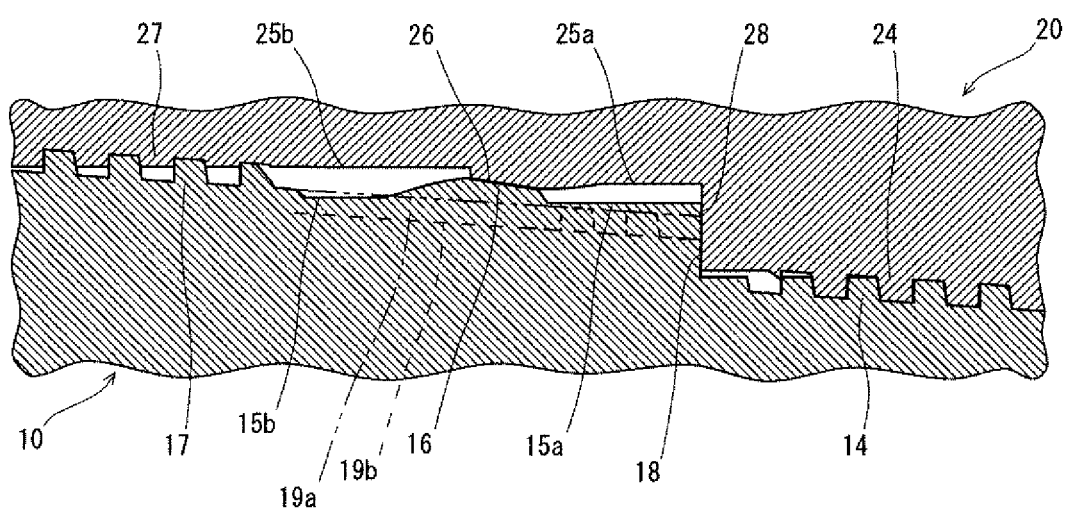
FIG. 7 is an enlarged longitudinal sectional view of the threaded joint for steel pipes according to the second embodiment of the present invention, showing a region in the vicinity of a second seal portion, which is the outer one of the seal portions.

FIG. 6 is a longitudinal sectional view of a threaded joint for steel pipes according to a second embodiment of the present invention. FIG. 7 is an enlarged longitudinal sectional view of the threaded joint for steel pipes according to the second embodiment of the present invention, showing a region in the vicinity of a second seal portion, which is the outer one of the seal portions. The threaded joint according to the second embodiment shown in FIGS. 6 and 7 is a variation of the threaded joint according to the first embodiment shown in FIGS. 4 and 5, and therefore descriptions redundant to those given in the first embodiment will not be repeated where appropriate.

As shown in FIGS. 6 and 7, the threaded joint of the second embodiment is similar to the threaded joint of the first embodiment in that a shoulder surface 11 is disposed on the free end of the pin 10 and two metal-to-metal seal portions are provided, but differs in that an additional, auxiliary shoulder surface 18 is included.

Specifically, the pin 10 includes an auxiliary shoulder surface 18 disposed between the inner, first male threaded portion 14 and first annular portion 15a, such that the auxiliary shoulder surface 18 is continuous with the first annular portion 15a. The auxiliary shoulder surface 18 is an annular surface perpendicular to the pipe axis CL. It is noted that the auxiliary shoulder surface 18 may be slightly inclined in such a manner that the outer circumferential side thereof is closer to the free end of the pin 10, similarly to the shoulder surface 11 of the pin 10. The box 20 includes an auxiliary shoulder surface 28 corresponding to the auxiliary shoulder surface 18 of the pin 10.

In the case of the threaded joint of the second embodiment, the tapered surface defined by the first threaded portion is closer to the pipe axis CL than the tapered surface defined by the second threaded portion. This is because of the auxiliary shoulder surfaces 18, 28 provided between the first threaded portion (the first male threaded portion 14 and the first female threaded portion 24) and the second threaded portion (the second male threaded portion 17 and the second female threaded portion 27). Thus, in the threaded joint of the second embodiment, the pin 10 has a smaller outside diameter in the region of the inner first male threaded portion 14 and first sealing surface 13 and therefore has a thinner wall thickness therein, than in the threaded joint of the first embodiment.

In a fastened state, the shoulder surfaces 11, 21 are in pressure contact with each other and the auxiliary shoulder surfaces 18, 28 are also in pressure contact with each other. The pressure contact between the shoulder surfaces 11, 21 imparts the axial tightening force primarily to the load flanks of the first male threaded portion 14 of the pin 10. The pressure contact between the auxiliary shoulder surfaces 18, 28 imparts the axial tightening force primarily to the load flanks of the second male threaded portion 17 of the pin 10.

With regard to the time at which the shoulder surfaces 11, 21 are brought into contact with each other and the time at which the auxiliary shoulder surface 18, 28 are brought into contact with each other in the course of fastening thread, it is preferred that the two contacts occur simultaneously or the contact between the auxiliary shoulder surfaces 18, 28 occur prior to the contact between the shoulder surfaces 11, 21. With the contacts timed in such a manner, the balance between the contact force of the shoulder surfaces 11, 21 and the contact force of the auxiliary shoulder surfaces 18, 28 is maintained. As a result, damage to the pin 10 and the box 20 is reduced.

The threaded joint of the second embodiment also produces advantageous effects similar to those of the first embodiment described above. In the second embodiment, particularly, because of the presence of the auxiliary shoulder surfaces 18, 28, the pin 10 has a reduced wall thickness in the region of the inner first male threaded portion 14 and first sealing surface 13. As a result, the region having a reduced wall thickness effectively undergoes radially outward deformation when internal pressure has been applied to the threaded joint. Consequently, the contact pressure between the first sealing surfaces 13, 23 is amplified.

The following are additional descriptions of preferred embodiments of the threaded joint according to the second embodiment.

With regard to the pin 10, $A_0$ is defined as a cross-sectional area of the tubular body in a plane perpendicular to the pipe axis CL, and $A_2$ is defined as a total of projected areas of the shoulder surface 11 and the auxiliary shoulder surface 18 in a plane perpendicular to the pipe axis CL. Preferably, the area ratio $A_2/A_0$ (hereinafter also referred to as the "ratio of the total shoulder surface area to the tubular body area") is at least 30%. More preferably, the area ratio $A_2/A_0$ is at least 35%. The reason for this is as follows. The area ratio $A_2/A_0$ is actually dependent on the areas of the shoulder surface 11 and the auxiliary shoulder surface 18. In the case where the area ratio $A_2/A_0$ is smaller, because of the smaller areas of the shoulder surface 11 and the auxiliary shoulder surface 18, the shoulder surface 11 and the auxiliary shoulder surface 18 cannot withstand an excessive compressive load when it has been applied to the threaded joint. In such a case, the shoulder surface 11, and the nose portion 12 and the first sealing surface 13 extending continuously from the shoulder surface 11, undergo plastic deformation, so that the contact between the first sealing surfaces 13, 23 becomes unstable. In addition to this, the auxiliary shoulder surface 18, and the first annular portion 15a and the second sealing surface 16 extending continuously from the auxiliary shoulder surface 18, undergo plastic deformation, so that the contact between the second sealing surfaces 16, 26 becomes unstable. As a result, the contact pressure between the first sealing surfaces 13, 23 and the contact pressure between the second sealing surfaces 16, 26 may be decreased. For this reason, the ratio of the total shoulder surface area to the tubular body area $A_2/A_0$ is preferably suitably large.

The upper limit of the ratio of the total shoulder surface area to the tubular body area $A_2/A_0$ is not particularly limited. However, too large an area ratio $A_2/A_0$ means the areas of the shoulder surface 11 and the auxiliary shoulder surface 18 are actually too large, i.e., the outside diameters of the shoulder surface 11 and the auxiliary shoulder surface 18 of the pin 10 are too large. Accordingly, the box 20 has larger inside diameter in the region of the first female threaded portion 24 and the first sealing surface 23. This results in the need to increase the outside diameter of the box in order to ensure that the critical section of the box 20 has a sufficient cross-sectional area. Moreover, it becomes difficult to ensure sufficient lengths of engagement of the first threaded portion and the second threaded portion. Thus, for practical applications, the ratio of the shoulder surface area to the tubular body area $A_2/A_0$ is preferably up to 60%.

With regard to the pin 10, $A_2$ is defined as a total of projected areas of the shoulder surface 11 and the auxiliary shoulder surface 18 in a plane perpendicular to the pipe axis CL, and $A_1$ is defined as the projected area of the shoulder surface 11 in a plane perpendicular to the pipe axis CL. Preferably, the area ratio $A_1/A_2$ (hereinafter also referred to as the "ratio of the shoulder surface area to the total shoulder surface area") is at least 35%. More preferably, the area ratio $A_1/A_2$ is at least 40%. The reason for this is as follows. The area ratio $A_1/A_2$ is actually dependent on the area of the shoulder surface 11 relative to the auxiliary shoulder surface 18. In the case where the area ratio $A_1/A_2$ is smaller, because of the smaller area of the shoulder surface 11, the shoulder surface 11 cannot withstand an excessive compressive load when it has been applied to the threaded joint. In such a case, the shoulder surface 11, and the nose portion 12 and the first sealing surface 13 extending continuously from the shoulder surface 11, undergo plastic deformation, so that the contact between the first sealing surfaces 13, 23 becomes unstable. As a result, the contact pressure between the first sealing surfaces 13, 23 may be decreased. For this reason, the ratio of the shoulder surface area to the total shoulder surface area $A_1/A_2$ is preferably suitably large.

The upper limit of the ratio of the shoulder surface area to the total shoulder surface area $A_1/A_2$ is not particularly limited. However, too large an area ratio $A_1/A_2$ means the area of the shoulder surface 11 relative to the auxiliary shoulder surface 18 is actually too large, i.e., the wall thickness of the nose portion 12 continuous with the shoulder surface 11 and the region of the first male threaded portion 14 and the first sealing surface 13, of the pin 10, are too thick. As a result, the effective radially outward deformation does not occur in the region when internal pressure has been applied to the threaded joint, and therefore it is not possible to produce the effect of amplifying the contact pressure between the first sealing surfaces 13, 23. When this is the case, the contact pressure between the first sealing surfaces 13, 23 may be decreased. Thus, for practical applications, the ratio of the shoulder surface area to the total shoulder surface area $A_1/A_2$ is preferably up to 55%.

Preferred outside diameters and lengths of the first annular portion 15a and preferred lengths of the nose portion 12, of the pin 10, are similar to those of the first embodiment.

The present invention is not limited to the embodiments described above, and various modifications may be made without departing from the spirit and scope of the present invention. For example, additional techniques may be used so that the engagement and intimate contact in the inner first threaded portion can be loosened exclusively in a region near the first sealing portion when internal pressure has been applied to the threaded joint. This allows the region of the inner first sealing surface 13 of the pin 10 to more effectively undergo radially outward deformation, so that the contact pressure between the first sealing surfaces 13, 23, is further amplified. One possible approach is to employ a configuration in which, in the first threaded portion, the first male threaded portion 14 or the first female threaded portion 24 is provided with incomplete threads of imperfect thread form, in a region near the first sealing surface. As an example of this configuration, the area of the incomplete threads may be such that the first female threaded portion 24 of the box 20 has crests defining a cylindrical periphery parallel to the pipe axis CL and therefore has thread heights that are lower than the normal thread height. Thus, in the incomplete thread area, clearances are provided between the crests of the first female threaded portion 24 and the roots of the first male threaded portion 14. In this case, the length of the incomplete thread area is three to nine times the thread pitch of the first female threaded portion 24 (about 15 to 45 mm).

The threaded joints of the above embodiments may be employed either as an integral-type threaded joint or as a coupling-type threaded joint.

EXAMPLES

To verify the advantages of the present invention, numerical simulation and analysis was carried out using the elasto-plastic finite element method.

Test Conditions

In the FEM analysis, models of coupling-type threaded joints for oil country tubular goods were prepared with the dimensions of the first annular portion, the nose portion, and the shoulder surface (including the auxiliary shoulder surface) of the pin being varied. For the principal dimensions, the following two types of steel pipe (pin) and coupling (box) were specified.

(1) Steel pipe size: 10⅛ [inch]×0.8 [inch] (outside diameter of 257.2 mm and wall thickness of 20.3 mm), Coupling outside diameter: 276.6 mm.

(2) Steel pipe size: 7⅝ [inch]×1.2 [inch] (outside diameter of 193.7 mm and wall thickness of 30.5 mm), Coupling outside diameter: 217.8 mm.

The common conditions were as follows.

Grade of steel pipe and coupling: API standard Q125 (carbon steel having a yield stress of 125 [ksi]).

Thread form: taper of 1/10 (for 10⅛ [inch] pipes) or taper of 1/11 (for 7⅝ [inch] pipes); thread height of 1.575 [mm]; thread pitch of 5.08 [mm]; load flank angle of −3°; stabbing flank angle of 10°; and stabbing flank clearance of 0.15 [mm].

In the FEM analysis, the material was specified as isotropic hardening elasto-plastic, and the models used were prepared to have a modulus of elasticity of 210 [GPa], and a nominal yield strength, expressed as 0.2% proof stress, of 125 [ksi] (=862 [MPa]). The tightening was carried out to the point where the shoulder surfaces of the pin and the box were brought into contact with each other, and further continued up to a point of 1.5/100 turns.

The varied dimensional conditions are shown in Table 1 below.

TABLE 1

| No. | Pin Size | First annular Portion Length [Number of Pitches] | First annular Portion O.D. [Relative to reference tapered surface] | Nose portion | Area ratio [%] Total shoulder surface/ tubular body A1/A0, A2/A0 | Area ratio [%] Shoulder surface/ total shoulder surface A1/A2 | Minimum of average contact pressure at sealing surface [MPa] Internal pressure cycle (first sealing surface) | Minimum of average contact pressure at sealing surface [MPa] External Pressure Cycle (second sealing surface) | Evaluation | Classification |
|---|---|---|---|---|---|---|---|---|---|---|
| #1 | 10⅛" × 0.8" | 0 * | — | Absent * | 45 | 44 | 119 | 168 | NA | Comp. Example. |
| #2 | 10⅛" × 0.8" | 2.4 | Small | Absent * | 41 | — | 150 | 257 | NA | Comp. Example |
| #3 | 10⅛" × 0.8" | 2.4 | Large | Absent * | 41 | — | 138 | 312 | NA | Comp. Example |
| #4 | 10⅛" × 0.8" | 2.4 | Large | Present | 35 | — | 266 | 313 | G | Inv. Example |
| #5 | 10⅛" × 0.8" | 1 | Large | Present | 58 | 40 | 264 | 307 | G | Inv. Example |
| #6 | 7⅝" × 1.2" | 2 | Large | Present | 43 | 45 | 303 | 400 | E | Inv. Example |
| #7 | 7⅝" × 1.2" | 1 | Large | Present | 43 | 45 | 305 | 387 | E | Inv. Example |
| #8 | 7⅝" × 1.2" | 3 | Large | Present | 43 | 45 | 312 | 401 | E | Inv. Example |
| #9 | 7⅝" × 1.2" | 3 | Large | Present | 43 | 35 | 243 | 449 | A | Inv. Example |
| #10 | 7⅝" × 1.2" | 3 | Large | Present | 43 | 40 | 301 | 327 | E | Inv. Example |
| #12 | 7⅝" × 1.2" | 3 | Large | Present | 43 | 50 | 292 | 393 | G | Inv. Example |
| #13 | 7⅝" × 1.2" | 3 | Large | Present | 43 | 55 | 292 | 436 | G | Inv. Example |
| #14 | 7⅝" × 1.2" | 5 | Large | Present | 43 | 45 | 314 | 471 | E | Inv. Example |
| #15 | 7⅝" × 1.2" | 3 | Large | Present | 43 | 37 | 228 | 388 | A | Inv. Example |

TABLE 1-continued

| | | First annular Portion | | | Area ratio [%] | | Minimum of average contact pressure at sealing surface [MPa] | | | |
|---|---|---|---|---|---|---|---|---|---|---|
| | | | | | Total | | | | | |
| No. | Pin Size | Length [Number of Pitches] | O.D. [Relative to reference tapered surface] | Nose portion | shoulder surface/ tubular body $A_1/A_0$, $A_2/A_0$ | Shoulder surface/ total shoulder surface $A_1/A_2$ | Internal pressure cycle (first sealing surface) | External Pressure Cycle (second sealing surface) | Evaluation | Classification |
| #16 | 7⅝" × 1.2" | 3 | Large | Present | 30 | 45 | 234 | 417 | A | Inv. Example |
| #17 | 7⅝" × 1.2" | 3 | Large | Present | 50 | 45 | 352 | 434 | E | Inv. Example |

Remarks) The symbol "*" indicates that the value is outside the range specified by the present invention.

Models of Test No. 1 to Test No. 3 are comparative examples that do not satisfy the conditions specified by the present invention, and none of them had a nose portion in the pin. Models of Test No. 4 to Test No. 17 are inventive examples that satisfy the conditions specified by the present invention. Among them, the model of Test No. 4 was prepared based on the threaded joint of the first embodiment shown in FIGS. 4 and 5, and the models of Test No. 5 to Test No. 17 were prepared based on the threaded joint of the second embodiment shown in FIGS. 6 and 7.

Evaluation Method

In the FEM analysis, load sequence which simulated that in an ISO 13679 Series A test was applied to the models in a fastened state. To evaluate the sealing performance of the sealing surfaces, the minimum values of average contact pressures at the sealing surfaces, in the internal pressure cycle (the first and second quadrants) and the external pressure cycle (the third and fourth quadrants) in the load sequence, were compared. (It is noted that the higher the minimum value of average contact pressure, the better the sealing performance of the sealing surfaces.)

Evaluations of the sealing performance of the sealing surfaces were made on the following four level scale.

E: Excellent. The minimum value of the average contact pressure at the sealing surfaces is 300 MPa or greater in both the internal pressure cycle and the external pressure cycle.

G: Good. The minimum value of the average contact pressure at the sealing surfaces is 300 MPa or greater in the external pressure cycle and is in the range of 250 MPa to less than 300 MPa in the internal pressure cycle A: Acceptable. The minimum value of the average contact pressure at the sealing surfaces is 300 MPa or greater in the external pressure cycle and is in the range of 200 MPa to less than 250 MPa in the internal pressure cycle.

NA: Not Acceptable. The minimum value of the average contact pressure at the sealing surfaces is less than 300 MPa in the external pressure cycle and less than 200 MPa in the internal pressure cycle.

Test Results

The test results are shown in Table 1 above.

In each of the tests of No. 1 to No. 3, which are comparative examples, the pin did not have a nose portion, and as a result, the sealing performance against internal pressure was not acceptable. Among them, in the test of No. 1, in which the pin did not include the first annular portion, the sealing performance against external pressure was also not acceptable.

In each of the tests of No. 4 to No. 17, which are inventive examples, the pin had both the nose portion and the first annular portion, and as a result, the sealing performances against internal pressure and external pressure were both improved. In particular, in each of the tests of Nos. 4 to 8, 10 to 14, and 17, the ratio of the shoulder surface area to the tubular body area $A_1/A_0$, the ratio of the total shoulder surface area to the tubular body area $A_2/A_0$, and the ratio of the shoulder surface area to the total shoulder surface area $A_1/A_2$ were each large, and as a result, high sealing performances against both internal pressure and external pressure were exhibited.

In each of the tests of No. 9 and No. 15, the ratio of the shoulder surface area to the total shoulder surface area $A_1/A_2$ was relatively small, and as a result, the degree of improvement in the sealing performance against internal pressure was smaller. Furthermore, in the test of No. 16, the ratio of the total shoulder surface area to the tubular body area $A_2/A_0$ was relatively small, and as a result, the degree of improvement in the sealing performance against internal pressure was smaller.

The results described above demonstrate that threaded joints for steel pipes according to the present invention exhibit improved sealing performance against internal pressure as well as external pressure.

INDUSTRIAL APPLICABILITY

A threaded joint according to the present invention is capable of being effectively utilized in connection of heavy wall steel pipes that are used in harsh environments as oil country tubular goods.

REFERENCE SIGNS LIST

10: pin, 11: shoulder surface, 12: nose portion,
13: first sealing surface, 14: first male threaded portion,
15a: first annular portion, 15b: second annular portion,
16: second sealing surface, 17: second male threaded portion,
18: auxiliary shoulder surface,
19a: extension of tapered surface defined by roots of second male threaded portion,
19b: reference tapered surface,
20: box, 21: shoulder surface, 22: recessed portion,
23: first sealing surface, 24: first female threaded portion,
25a: first annular portion, 25b: second annular portion,

The invention claimed is:

1. A threaded joint for steel pipes, comprising: a tubular pin and a tubular box, the pin and the box being fastened by screwing the pin onto the box,
   the pin comprising: in order from an end thereof, a shoulder surface; a first sealing surface; a tapered first male threaded portion; a second sealing surface; and a tapered second male threaded portion,
   the second sealing surface being located entirely radially outside of an extension of a tapered surface defined by roots of the second male threaded portion, the extension, tapered surface, and the second sealing surface viewed in a longitudinal sectional view of the threaded joint,
   the box comprising: a shoulder surface; a first sealing surface; a tapered first female threaded portion; a second sealing surface; and a tapered second female threaded portion, corresponding to the shoulder surface, the first sealing surface, the first male threaded portion, the second sealing surface, and the second male threaded portion, of the pin, respectively, wherein,
   the pin further includes: a nose portion disposed between the shoulder surface and the first sealing surface, the nose portion being continuous with the first sealing surface; and an annular portion disposed between the first male threaded portion and the second sealing surface, the annular portion being continuous with the second sealing surface,
   the box further includes: a recessed portion corresponding to the nose portion of the pin; and an annular portion corresponding to the annular portion of the pin, and
   in a fastened state: the shoulder surfaces are in contact with each other; the first sealing surfaces are in contact with each other; the second sealing surfaces are in contact with each other; a clearance is provided between the nose portion of the pin and the recessed portion of the box; a clearance is provided between the annular portion of the pin and the annular portion of the box; the first male threaded portion engages with the first female threaded portion; and the second male threaded portion engages with the second female threaded portion.

2. The threaded joint for steel pipes according to claim 1, wherein:
   the pin includes an auxiliary shoulder surface disposed between the first male threaded portion and the annular portion, the auxiliary shoulder surface being continuous with the annular portion; the box includes an auxiliary shoulder surface corresponding to the auxiliary shoulder surface of the pin; and, in a fastened state, the auxiliary shoulder surfaces are in contact with each other.

3. The threaded joint for steel pipes according to claim 2, wherein:
   during fastening thread, the contact between the shoulder surfaces and the contact between the auxiliary shoulder surfaces occur simultaneously, or the contact between the auxiliary shoulder surfaces occurs prior to the contact between the shoulder surfaces.

4. The threaded joint for steel pipes according to claim 3, wherein
   the nose portion of the pin has a length along the pipe axis, the length being at least 5 mm.

5. The threaded joint for steel pipes according to claim 2, wherein:
   the pin is configured such that, when a tubular body having the pin has a cross-sectional area $A_0$ in a plane perpendicular to the pipe axis, and the shoulder surface and the auxiliary shoulder surface have projected areas in a plane perpendicular to the pipe axis with a total of the projected areas being designated as $A_2$, an area ratio $A_2/A_0$ is at least 30%.

6. The threaded joint for steel pipes according to claim 5, wherein:
   the nose portion of the pin has a length along the pipe axis, the length being at least 5 mm.

7. The threaded joint for steel pipes according to claim 2, wherein:
   the pin is configured such that, when the shoulder surface and the auxiliary shoulder surface have projected areas in a plane perpendicular to the pipe axis, with a total of the projected areas being designated as $A_2$ and the projected area of the shoulder surface being designated as $A_1$, an area ratio $A_1/A_2$ is at least 35%.

8. The threaded joint for steel pipes according to claim 7, wherein:
   the nose portion of the pin has a length along the pipe axis, the length being at least 5 mm.

9. The threaded joint for steel pipes according to claim 2, wherein:
   the nose portion of the pin has a length along the pipe axis, the length being at least 5 mm.

10. The threaded joint for steel pipes according to claim 1, wherein:
    the pin is configured such that, when a tubular body having the pin has a cross-sectional area $A_0$ in a plane perpendicular to the pipe axis, and the shoulder surface has a projected area $A_1$ in a plane perpendicular to the pipe axis, an area ratio $A_1/A_0$ is at least 30%.

11. The threaded joint for steel pipes according to claim 10, wherein:
    the nose portion of the pin has a length along the pipe axis, the length being at least 5 mm.

12. The threaded joint for steel pipes according to claim 1, wherein:
    the annular portion of the pin has a minimum outside diameter greater than a diameter of a reference tapered surface, the reference tapered surface being a tapered surface having an outside diameter smaller than an outside diameter of the extension of the tapered surface defined by roots of the second male threaded portion by twice a height of threads of the second male threaded portion.

13. The threaded joint for steel pipes according to claim 12, wherein:
    the nose portion of the pin has a length along the pipe axis, the length being at least 5 mm.

14. The threaded joint for steel pipes according to claim 1, wherein:
    the annular portion of the pin has a length along the pipe axis, the length being equal to or greater than a thread pitch of the second male threaded portion.

15. The threaded joint for steel pipes according to claim 14, wherein:
    the nose portion of the pin has a length along the pipe axis, the length being at least 5 mm.

16. The threaded joint for steel pipes according to claim 1, wherein:

the nose portion of the pin has a length along the pipe axis, the length being at least 5 mm.

* * * * *